(12) United States Patent
Dupuis et al.

(10) Patent No.: US 7,094,283 B2
(45) Date of Patent: *Aug. 22, 2006

(54) BITUMINOUS PRODUCT AND PROCESS FOR PREPARING IT

(75) Inventors: Dominique Dupuis, Crepy en Valois (FR); Gilles Orange, Soisy sous Montmorency (FR)

(73) Assignee: Innophos, Inc., Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/972,598

(22) Filed: Oct. 25, 2004

(65) Prior Publication Data

US 2005/0115461 A1     Jun. 2, 2005

Related U.S. Application Data

(63) Continuation of application No. 10/461,639, filed on Jun. 13, 2003, now Pat. No. 6,808,558.

(60) Provisional application No. 60/392,767, filed on Jul. 1, 2002.

(30) Foreign Application Priority Data

Nov. 22, 2002   (FR) ................................. 02/14678

(51) Int. Cl.
C08L 95/00    (2006.01)
C09D 195/00   (2006.01)

(52) U.S. Cl. ................. 106/277; 106/284.1; 106/281.1

(58) Field of Classification Search ............. 106/284.1, 106/281.1, 277

See application file for complete search history.

(56) References Cited

U.S. PATENT DOCUMENTS

| 2,450,756 | A | 10/1948 | Hoiberg |
| 2,492,994 | A | 1/1950 | Harman et al. |
| 2,508,428 | A | 5/1950 | Smith et al. |
| 3,782,988 | A | 1/1974 | Alexander et al. |
| 6,074,469 | A | 6/2000 | Collins et al. |
| 6,808,558 | B1 * | 10/2004 | Dupuis et al. ........... 106/284.1 |

* cited by examiner

*Primary Examiner*—David Brunsman
(74) *Attorney, Agent, or Firm*—McCarter & English, LLP.

(57) ABSTRACT

The subject of the present invention is a process for preparing a bituminous product, characterized in that a compound based on a phosphoric or polyphosphoric acid supported on a mineral oxide of high porosity is used. The subject of the invention is also the bituminous product that can be obtained by the above process, and its uses.

8 Claims, No Drawings

BITUMINOUS PRODUCT AND PROCESS FOR PREPARING IT

CROSS-REFERENCE TO RELATED APPLICATIONS

This application is a Continuation of U.S. application Ser. No. 10/461,639, filed Jun. 13, 2003, now U.S. Pat. No. 6,808,558 entitled "Bituminous Product and Process for Preparing It", and claims the benefit of U.S. Provisional Application Ser. No. 60/392,767, filed Jul. 1, 2002, and France Application Serial No. 02/14678, filed Nov. 22, 2002, entitled "Produit Bitumineux Et Son Procede De Preparation", the disclosures of which are hereby incorporated by reference in their entirety as part of the present disclosure.

The subject of the present invention is a bituminous product and a process for preparing it.

The term "bituminous product" is understood to mean bitumens or any bitumen-based composition.

Bituminous products are used in particular in the fields of roadways, roofing materials, coverings and membranes. The use of asphalt for producing roadways may also be mentioned.

In general, bituminous products include aggregates or fillers. These may be granulates or stones, sand and fines.

However, such products have many drawbacks when they are used as such for various applications: mention may be made in particular of a high temperature sensitivity, limited adhesion to aggregates, mediocre low-temperature properties and low fatigue and impact strength.

In addition, bituminous products are difficult to handle and require specific technologies.

Thus, in the case of a roadway, in particular in the case of the pavement of a road, the principal constituents are bituminous mixes that consist of 95% by weight of aggregates and 5% by weight of bitumen, which serves as binder. In this case, the role of the bitumen as binder is predominant with regard to the properties of the road, which is subjected to various stresses of a mechanical origin, namely thermal fracture, fatigue and rutting.

This is because at low temperature (below about −10° C.), the binder, i.e. the bitumen, is in a glassy state and becomes brittle. Long transverse cracks due to the thermal stresses (thermal fractures), which are microcracks because of the heterogeneity of the material, may then form.

At a higher temperature (about at least 0° C.), the pavement may still crack owing to the effect of fatigue. This results in a multitude of cracks that are principally longitudinal and interconnected.

Finally, at higher temperatures (about 60° C.), the bitumen passes from the solid state to the viscous state, becoming more and more fluid. Thus the repeated passage of heavy loads, that vehicles, including heavy goods lorries, constitute, on the pavement contribute to making the bitumen, and therefore the pavement, undergo permanent deformation. This phenomenon is the origin of rutting.

The binder also makes the pavement impermeable, thus protecting the base courses of the road.

The main features required of the pavement of a road and therefore of the bituminous products serving as binder are therefore:

good crack resistance at low temperature (typically −15° C.);

low deformation at high temperature (typically +60° C.); and good fatigue strength in order to improve durability.

Manufacturers generally use additives to palliate the shortcomings of bituminous products and thus improve their properties.

It is known in particular to add phosphoric acids or polyphosphoric acids to these bituminous products.

However, these acids are not easy to use since these products are highly viscous and therefore not able to be handled easily. It follows that there are not insignificant losses of product, which incur higher costs.

In addition, these acids may crystallize during their storage and they are no longer usable as such, unless they undergo a heat treatment, which involves further handling and an increase in the costs due to the heat treatment step.

To meet the requirements of manufacturers, it has become necessary to find additives which palliate the drawbacks of phosphoric acids or polyphosphoric acids.

Thus, the problem that the present invention aims to solve is to provide an additive for bituminous products that can be handled easily, compared with phosphoric acids or polyphosphoric acids.

For this purpose, the invention provides a process for preparing a bituminous product, characterized in that a compound based on a phosphoric or polyphosphoric acid supported on a mineral oxide of high porosity is used.

The invention also provides a bituminous product that can be obtained by the process described above.

The advantage of the compound based on a phosphoric or polyphosphoric acid supported on a mineral oxide of high porosity is that it is in the form of a powder and can therefore be handled very easily compared with the abovementioned acid solutions, which are highly viscous.

Another advantage of this compound is that it makes it possible to reinforce the bituminous products into which it is incorporated, in particular as regards high-temperature strength.

Finally, this compound retains the same properties as those of phosphoric or polyphosphoric acids.

Other advantages and features of the present invention will become clearly apparent on reading the description and the examples, given solely by way of illustration but implying no limitation, that follow.

The invention firstly relates to a process for preparing a bituminous product, characterized in that a compound based on a phosphoric or polyphosphoric acid supported on a mineral oxide of high porosity is used.

The compound used according to the invention comprises a mineral oxide.

The mineral oxide must be of high porosity, which means that its pore volume is at least 1 ml/g and preferably at least 3 ml/g.

The mineral oxide may also have a large surface area.

The mineral oxide of high porosity may be especially chosen from silicas, aluminas and aluminosilicates.

Preferably the mineral oxide is a silica. Preferably said silica is a precipitated silica. For example, it may be a TIXOSIL 38, TIXOSIL 38D, TIXOSIL 38X or TIXOSIL 365 silica from Rhodia.

The mineral oxide may also be lamellar or exfoliated.

The mineral oxide may also be obtained from an oxide precursor.

The compound used according to the invention also comprises a phosphoric or polyphosphoric acid.

Preferably, the phosphoric acid is orthophosphoric acid.

Orthophosphoric acid, also called monophosphoric acid, corresponds to $H_3PO_4$.

The polyphosphoric acids according to the invention may be chosen from those described in the book entitled "*Phos-*

*phorus an outline of its Chemistry, Biochemistry and Uses*", 5$^{th}$ Edition, D. E. C. Corbridge, Elsevier, 1995, pages 170 and 180 to 182.

The polyphosphoric acid is preferably chosen from pyrophosphoric acid or diphosphoric acid of formula $H_4P_2O_7$, triphosphoric acid of formula $H_5P_3O_{10}$, polyphosphoric acids of formula $H_{n+2}P_nO_{3n+1}$, metaphosphoric acids of formula $H_nP_nO_{3n}$ or a blend thereof.

As indicated on page 181 of the above-mentioned document "*Phosphorus an outline of its Chemistry, Biochemistry and Uses*", commercial phosphoric acid or polyphosphoric acids are characterized by their $P_2O_5$ or $H_3PO_4$ equivalent expressed as a percentage by weight.

Thus, there is a class of acids called superphosphoric acids whose $H_3PO_4$ equivalent is greater than 100. These superphosphoric acids are the preferred polyphosphoric acids.

The compound employed according to the invention may be produced by bringing the mineral oxide into contact with phosphoric or polyphosphoric acid.

The maximum amount of phosphoric or polyphosphoric acid employed corresponds to the maximum amount of the said acid that can be absorbed by the mineral oxide.

The compound employed according to the invention may be produced by a process which includes a drying step after the mineral oxide has been brought into contact with the phosphoric or polyphosphoric acid.

In addition, the compound employed according to the invention may be hydrophobicized. In this case, it will be preferred to use hydrophobic agents chosen from silicones and fatty acids.

Several methods of implementing the incorporation of the compound according to the invention into the bitumen composition are possible.

Among these, one method of implementation relates to a process comprising the following steps:

1.—the bitumen composition is heated to a temperature of between 120° C. and 190° C.; and 2.—a sufficient amount of compound according to the invention is added, with stirring, to the bitumen composition of step 1.

The invention then relates to a bituminous product that can be obtained by the process described above.

The bituminous product according to the invention may be prepared according to a process for preparing hot mixes, which employs the compound according to the invention.

This hot-mix process comprises an additional step to the above process. This step consists in adding, with stirring and at a temperature of between 120° C. and 190° C., aggregates to the bitumen composition before, during, simultaneously with, or after the addition of compounds according to the invention.

For example, this hot-mix process may comprise the following steps:

1.—the bitumen composition is heated to a temperature between 120° C. and 190° C.;

2.—a sufficient amount of compound according to the invention is added, with stirring, to the bitumen composition of step 1; and 3.—aggregates are added, with stirring, to the bitumen composition of step 2.

In general, the aggregates are preheated to a temperature greater than 120° C., and generally between 120° C. and 190° C.

The invention also relates to the bituminous product that can be obtained by the hot-mix process described above.

The bituminous product according to the invention may also be prepared according to a process for preparing cold mixes, which employs the compound according to the invention.

This second possible method of implementation for incorporating the compound according to the invention is carried out at room temperature.

This process comprises the following steps:

1.—a bitumen emulsion is prepared by mixing water, bitumen and an emulsifier at room temperature;

2.—a sufficient amount of compound according to the invention is incorporated into a bitumen emulsion with stirring at room temperature;

3—the emulsion obtained in step 2 is spread in order to obtain a uniform layer of the mixture obtained in step 2; and 4—the bitumen emulsion is broken.

The invention also relates to the bituminous product that can be obtained by the cold-mix process described above.

It is also possible to add aggregates to the bitumen composition, with stirring and at room temperature, after the addition of compound according to the invention in step 2.

Finally, a third method of implementation is also possible which combines the above two, "hot" and "cold", methods of implementation.

This process comprises the following steps:

1.—the bitumen composition is heated to a temperature between 120° C. and 190° C.;

2.—a sufficient amount of compound according to the invention is added to the bitumen composition of step 1 with stirring;

3.—an emulsion of the bitumen obtained in step 2 is prepared by mixing water, the said bitumen and an emulsifier;

4.—the emulsion obtained in step 3 is spread in order to obtain a uniform layer of the mixture obtained in step 3; and 5.—the bitumen emulsion is broken.

This process may include an additional step which consists in adding, with stirring and at room temperature, aggregates to the bitumen emulsion obtained in step 3 of the process.

It should be noted that examples of bitumens to which the compound according to the present invention may be added include natural bitumens, pyrobitumens and artificial bitumens. Bitumens that are particularly preferred are those used for roadways, such as asphalt or maltha. Even more preferably, asphalt is used.

The bituminous product according to the invention may also contain other additives normally used in the bitumen field.

Mention may also be made as suitable additives according to the invention of elastomers, plastomers, or any other chemical agent known to those skilled in the art for improving the physico-chemical properties and the debonding resistance, whether by themselves or as blends.

The emulsifiers used to emulsify the bitumen are emulsifiers that are normally used by those skilled in the art in this technical field.

Provision may also be made for the bitumen used to be preoxidized hot by contact with air.

Finally, the invention relates to the use of the bituminous product according to the invention for the manufacture of mortars, coverings, especially road treatments.

The following examples illustrate the invention without however limiting the scope thereof.

EXAMPLES

1. Operating Method for the Preparation of an Additive for Bitumen, of the Type Comprising Phosphoric Acid on a Silica Support.

1.1. Determination of the Total Pore Volume of the Support

This involves introducing the amount of water needed to fill all the pores in the support. Our support here was silica T38A, batch 0012191 from Rhodia.

One gram of silica was weighed and water added to it by means of a burette. The water needed to fill the pores was 2.1 ml.

Therefore:

total pore volume of T38A=2.1 ml/g.

1.2. Dry Impregnation with 85% Orthophosphoric Acid at Room Temperature 200 g of silica were impregnated. The apparatus used was a rotating bowl.

Knowing that the density of 85% $H_3PO_4$ is 1.7, (2.1×1.7) g×200 g=714 g of 85% $H_3PO_4$ are therefore necessary.

In practice, it was possible to impregnate only with 658 g of acid.

When impregnation was finished, the "wetted" saturated powder was left to age for one hour and the powder was then dried in an oven at 50° C. for 72 hours.

Maximum Amount of Impregnated Orthophosphoric Acid (in Percentages by Weight)

| | |
|---|---|
| Amount of 85% ortho-phosphoric acid: | 658 g/(658 + 200) = 76.7% |
| Amount of 100% orthophosphoric acid: | (658 × 0.85)/(658 + 200) = 65.2%. |

2. Rheological Properties of Bitumens with or without the Additive Prepared in Example 1.

70/100 grade bitumen (Pen) was used for the tests. This is a bitumen from Shell Petit Couronne (France).

2.1. Preparation of the Additive-Containing Bitumen

The bitumen was taken from a drum and then placed in a beaker; the beaker was then heated on a hotplate to 170° C.

The additive in powder form was then incorporated.

The mixture was then maintained at 170° C. for about 25 minutes, with vigorous stirring by means of a rotary stirrer (260 rev/min). The temperature was maintained strictly below 180° C. so as not to impair the characteristics of the bitumen.

After mixing, the mixture was maintained for 5 minutes at about 170° C. with slow-speed stirring so as to remove the air bubbles that might have formed. The mixing was then stopped and the mixture was ready to be used.

2.2. Rheology Tests

The rheological characterization of the additive-containing bitumen was carried out using a procedure derived from the SHRP (AASHTO TP5-98) standards: DSR (Dynamic Shear Rheometer) tests.

The frequency range used was from 7.8 Hz to 200 Hz for a temperature range from 25° C. to 60° C.

The rheology tests were carried out in annular shear using a Metravib RDS VA 2000 viscoelasticimeter.

The liquid bitumen was introduced into the shear cell, which was preheated to 110° C. When the temperature had dropped to about 45° C., the bitumen no longer flowed and the entire structure was then clamped, ready for the measurements.

The bitumen specimen, which was cylindrical, had a thickness of 1 mm.

The tests were carried out at various temperatures (30, 40, 50 and 60° C.) and in a frequency range allowing the behaviour of the material to be demonstrated: 7.8; 15.6; 31.2; 62.5; 125 and 200 Hz.

2.3. Results Obtained

The results obtained related to the Coulomb modulus (complex modulus) G*, the elastic component G', the viscous component G" and the phase angle δ.

These results were able to be presented either for a constant frequency as a function of temperature or for a constant temperature (isotherm) as a function of frequency.

Three products were compared:

i. control bitumen with no additive;

ii. bitumen to which mineral powder treated with orthophosphoric acid according to the invention was added;

iii. by way of comparison, bitumen to which 1.2% polyphosphoric acid in liquid form was added.

The table below (Table 1) gives the values measured at 60° C. for a frequency of 7.8 Hz.

TABLE 1

| | G* (Pa) | G' (Pa) | G" (Pa) | δ |
|---|---|---|---|---|
| Shell 70/100 (bitumen i) | 10.950 | 880 | 10.950 | 85.4 |
| Shell + mineral powder (bitumen ii) | 18.500 | 3550 | 18.050 | 78.5 |
| Shell + 1.2% PPA acid (bitumen iii) | 21.250 | 4750 | 20.900 | 77.2 |

This clearly shows the reinforcing (stiffening) effect provide by the powder additive: increase in the complex G* and above all in the elastic component G'.

The phase angle δ is substantially reduced, which means a more elastic behavior of the additive-containing bitumen.

The table below (Table 2) gives the values measured at 25° C. (and 40° C. in the case of the phase angle δ) for a frequency of 7.8 Hz.

The critical temperature Tc is determined according to the criterion described in the SHRP procedure:

Tc is the temperature for which the G*/sin δ ratio is greater than 1000 Pa.

The thermal susceptibility of the bitumen was determined by an index SI: thermal susceptibility index.

SI is defined by the slope a of the straight line log G*=f(T) at 7.8 Hz:

$$\frac{20 - SI}{10 + SI} = 50.|a|$$

TABLE 2

| | G*, 25° C. ($10^6$ Pa) | G', 25° C. ($10^6$ Pa) | G", 25° C. ($10^6$ Pa) | δ 40° C. | Tc (° C.) | SI |
|---|---|---|---|---|---|---|
| Shell 70/100 (bitumen i) | 2.57 | 1.02 | 2.35 | 78.0 | 74.5 | −3.18 |
| Shell + mineral powder (bitumen ii) | 3.72 | 1.91 | 3.19 | 71.1 | 78.1 | −3.05 |
| Shell + 1.2% PPA acid (bitumen iii) | 3.33 | 1.73 | 2.84 | 69.5 | 80.7 | −2.75 |

The critical temperature Tc is greatly increased when the powder additive is present.

Likewise, a substantial lowering of the thermal susceptibility SI is noted.

The phase angle δ (at 40° C.) is greatly reduced, which means a more elastic behavior of the additive-containing bitumen.

The invention claimed is:

1. A method for preparing a bituminous product comprising the steps of:
   heating bitumen to a temperature of from about 110° C. to about 200° C.; and
   adding a sufficient amount of the composition comprising:
      an acid component selected from the group consisting of phosphoric acid, polyphosphoric acid, and combinations thereof; and
      a mineral oxide support component, wherein the mineral oxide is a high porosity mineral oxide;
   to said bitumen while stirring to obtain a bituminous product having improved crack resistance and deformation properties.

2. The method of claim 1, wherein the bitumen comprises natural bitumens, pyrobitumens, artificial bitumens, asphalt, maltha, or combinations thereof.

3. The method of claim 2, wherein the bitumen further comprises an additive selected from the group consisting of elastomers, plastomers, or other chemical agent.

4. A method for preparing a bituminous product comprising the steps of:
   heating bitumen to a temperature of from about 110° C. to about 200° C.; and
   adding a sufficient amount of the composition comprising:
      an acid component selected from the group consisting of phosphoric acid, polyphosphoric acid, and combinations thereof; and
      a mineral oxide support component, wherein the mineral oxide is a high porosity mineral oxide;
   to said bitumen while stirring to obtain a bituminous product having improved crack resistance and deformation properties; and
   adding aggregates into the mixture while stirring.

5. A method for preparing a bituminous product comprising the steps of:
   mixing water bitumen, and an emulsifier at a temperature from about 15° C. to about 25° C.;
   adding a sufficient amount of the composition comprising:
      an acid component selected from the group consisting of phosphoric acid, polyphosphoric acid, and combinations thereof; and
      a mineral oxide support component, wherein the mineral oxide is a high porosity mineral oxide;
   to said bitumen while stirring to obtain a bituminous product having improved crack resistance and deformation properties;
   spreading the emulsion in order to obtain a uniform layer;
   drying the emulsion; and
   breaking the bitumen emulsion.

6. The method of claim 5, wherein the method further comprises the step of adding aggregates to the bitumen emulsion after addition of the composition comprising:
   an acid component selected from the group consisting of phosphoric acid, polyphosphoric acid, and combinations thereof; and
   a mineral oxide support component, wherein the mineral oxide is a high porosity mineral oxide;
   and stirring.

7. A method for preparing a bituminous product comprising the steps of:
   heating bitumen to a temperature of from about 110° C. to about 200° C.; and
   adding a sufficient amount of the composition comprising:
      an acid component selected from the group consisting of phosphoric acid, polyphosphoric acid, and combinations thereof; and
      a mineral oxide support component, wherein the mineral oxide is a high porosity mineral oxide;
   to said bitumen while stirring to obtain a bituminous product having improved crack resistance and deformation properties;
   mixing with water, and an emulsifier;
   spreading the emulsion in order to obtain a uniform layer;
   drying the emulsion; and
   breaking the bitumen emulsion.

8. The method of claim 7, farther comprising the step of cooling the bitumen emulsion to room temperature then adding aggregates while stirring.

* * * * *